July 4, 1961  A. W. SIMAN ET AL  2,990,852
PNEUMATIC PRESSURE SWITCH
Filed Nov. 6, 1958

INVENTORS
Alfred W. Siman
William A. V. Thomsen
BY
J. William Carson
ATTORNEY

United States Patent Office 2,990,852
Patented July 4, 1961

2,990,852
PNEUMATIC PRESSURE SWITCH
Alfred W. Siman, Elizabeth, and William A. V. Thomsen, Glen Ridge, N.J., assignors to Specialties Development Corporation, Belleville, N.J., a corporation of New Jersey
Filed Nov. 6, 1958, Ser. No. 772,245
4 Claims. (Cl. 137—620)

The present invention relates to pneumatic pressure responsive devices, and, more particularly, to such devices which are subjected to high pressures on the order of 1500 to 5000 p.s.i. and are capable of controlling the flow of air in response to relatively small changes in pressure at such high pressures.

The pressure sensing element of devices of the foregoing character must be capable of withstanding such high pressures and changes in pressures without structural failure for more than 20,000 cycles of operation. To accomplish this, the sensing element usually is a rugged metallic diaphragm which by its very nature has but a small distance of travel or deflection, for example .015 to .020 of an inch.

Consequently, a valve for controlling the flow of air in response to such movement, must move from a fully closed to a fully open position in even a smaller distance of travel, and naturally must not have leakage when in its fully closed position. Such leakage can be prevented by a gasket or seat which when engaged by a valve member provides a tight seal.

At the high pressures previously mentioned, many types of materials are unsuitable because they are deformed by the pressure of the valve member thereon which alters its shape and destroys the sealing function of the gasket or seat. Other types of materials have been found to be capable of withstanding high pressure, but since such valves must be operable from −65° F. to at least 160° F., the thermal contraction of the material at the lower temperatures in effect moved the sealing surface of the gasket or seat away from the valve member and caused premature opening of the valve and the thermal expansion of the material at the higher temperatures delayed the opening of the valve.

Accordingly, an object of the present invention is to provide a pneumatic switch or air flow control valve which is not subject to the foregoing disadvantages.

Another object is to provide such a valve which is rapid and reliable in operation and has a long useful life.

Another object is to provide a high pressure, short travel valve which is not affected by thermal contraction and expansion in the range of −65° F. to 160° F.

Another object is to provide an improved seat structure for such valves.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
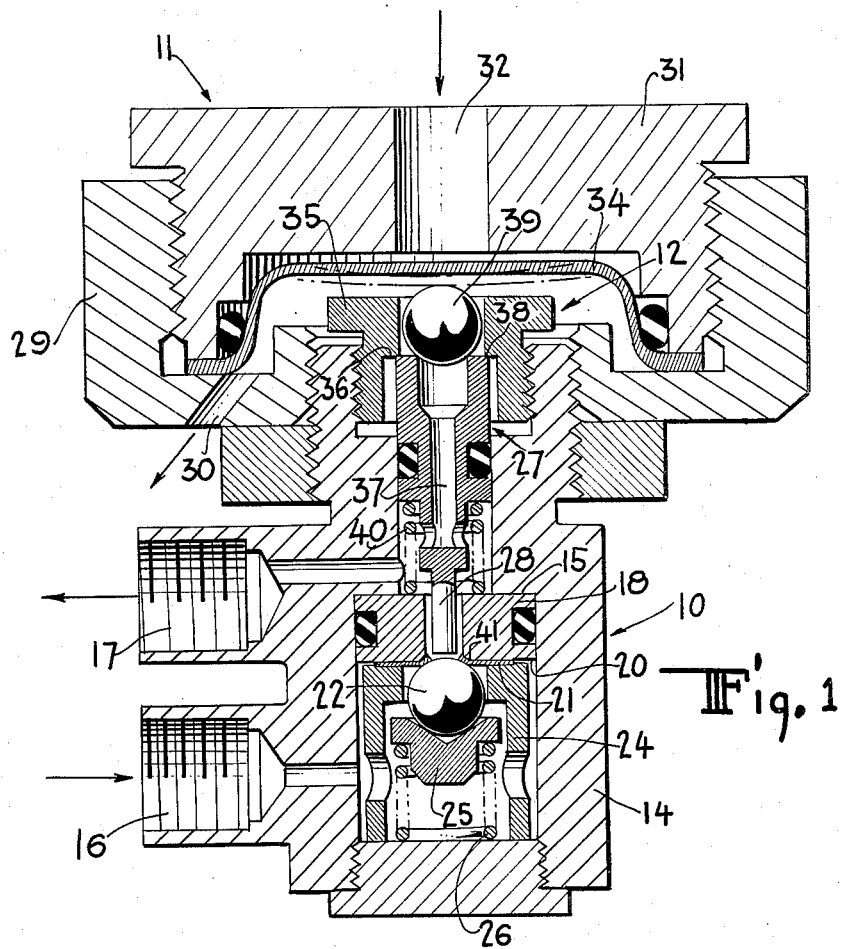
FIG. 1 is an enlarged fragmentary longitudinal sectional view of a pneumatic pressure responsive switch or valve in accordance with the present invention.

Referring to the drawing in detail, apparatus is shown which generally comprises a pilot valve 10 for controlling the flow of air under pressure to operate a pressure actuated device for opening a main valve (not shown), a pressure responsive device 11 for controlling the operation of the valve 10, and a relief valve 12 for causing the main valve to close.

The valve 10 comprises a body 14 having a bore extending therethrough which is stepped to provide a downwardly facing shoulder 15 and having a side inlet 16 below the shoulder and a side outlet 17 above the shoulder, a rigid metallic seat member 18 abutting the shoulder and formed with a port 19 surrounded by a flat downwardly facing surface 20, a disc 21 formed with an aperture in registry with the port, a ball 22 adjacent the aperture of the disc, an apertured cage 24 for the ball also serving as means for holding the disc against the seat member surface, a follower 25 for the ball, a spring 26 for urging the follower and the ball against the disc, and a stem 27 having a tip 28 at its lower end extending through the port for unseating the ball.

The pressure responsive device 11 comprises a lower chamber member 29 formed with a vent 30 and secured to the valve body 14 at its upper end, an upper chamber member 31 formed with a high pressure air inlet 32 and secured to the lower chamber member, and a diaphragm 34 secured between the chamber members for operating the stem in the manner about to be described.

The relief valve 12 includes a plug 35 adjustably threaded into the bore of the valve body 14 having a stepped bore providing a downwardly facing shoulder 36 which serves as a stop for the upper end of the stem 27. The stem has a passageway 37 for establishing flow communication between the valve outlet 17 and the vented side of the chamber which terminates in a seat 38 at its upper end for a ball 39 disposed in the bore of the plug 35. The ball controls the venting of the device (not shown) connected to the valve outlet and is engaged by the diaphragm 34 under certain conditions of operation to move the stem downwardly to unseat the ball 22 in opposition to a spring 40.

The diaphragm 34, as shown herein, is a hat-shaped member formed of prestressed steel having a thickness of about .042 inch. This member, when subjected to air pressure increasing from 0 to 3000 p.s.i. at the inlet 32, travels or is deflected at its center a distance of about .017 inch. Accordingly, the plug 35 is adjusted so that the diaphragm touches the ball 39 when a pressure of 3000 p.s.i. is exerted on the diaphragm. It is desired that an increase pressure of about 300 p.s.i. sensed by the diaphragm effects further slight movement thereof which is sufficient to depress the stem 27 through the ball 39 and cause the ball 22 to be unseated whereby air flows through the valve 10.

The distance the ball 22 travels to open the valve 10 due to additional deflection of the diaphragm is only about .0001 inch. The disc 21 therefore must provide a tight seal when the ball is seated and must enable the valve to be fully open when the ball is unseated.

In accordance with the present invention, this is accomplished by making the seat member 20 and the ball 22 of a hard steel such as stainless steel which will not be appreciably deformed, and making the disc of a thin highly durable film of resin having a thickness of between about .0050 and about .0075 inch. A suitable resin is polyethylene terephthalate ("Mylar" which is a trademark of E. I. du Pont de Nemours & Co.) which is available in such thicknesses. This resin has a relatively low coefficient of thermal expansion, and is so tough that it seals but yet resists being deformed whereby films having the above specified thicknesses do not change in dimension when engaged by the ball 22 and throughout the temperature range of −65° to 160° F.

Figure 2:
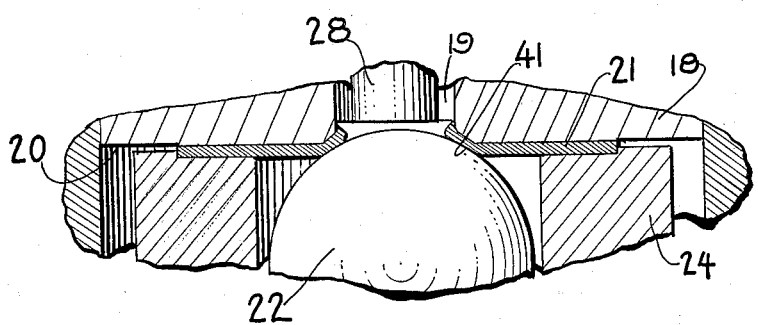
FIG. 2 is a greatly enlarged fragmentary sectional view of a valve seat in accordance with the present invention.

As shown more clearly in FIG. 2, the seal can be improved by providing the disc 21 with an annular arcuate zone 41 surrounding its aperture and extending partially into the port 19. The curvature of the zone 41 matches that of the ball 22, that is, it has the same radius as the ball. The seal is thereby provided by a band-like zone rather than by line contact between the edge of the aperture and the ball.

In practice it has been found that such structure can be provided by a ball 22 having a .071 inch radius, a port 19 having a .096 inch diameter which meets the surface 20 at a radius not exceeding .005 inch, a disc having a thickness of .007 inch, and an aperture of about .085 inch diameter at the upper end of the zone 41.

As previously indicated, the apparatus just described can be utilized wherever it is desired to energize a device when the high pressure air exceeds a given value and to de-energize the device when the pressure goes below that value. For example, the apparatus may be used in a compressor system for supplying high pressure air to a reservoir to render the compressor ineffective when the pressure of the air in the reservoir exceeds 3000 p.s.i. and to render the compressor again effective when the pressure drops below 3000 p.s.i.

In such a system, the apparatus operates in the manner about to be described. When the pressure of the air in the reservoir is zero, the movable parts of the valves 10 and 12 and the pressure responsive device 11 will be in the positions shown in FIG. 1. After the compressor has been operating for a sufficient duration to build up a pressure of 3000 p.s.i. in the reservoir and at the chamber inlet 32, which is sensed by the diaphragm, the diaphragm will be deflected to just touch the ball 39, as shown in broken lines. In the event the air is used at a lesser rate than it is supplied by the compressor, the pressure of the air in the reservoir will rise.

For example, should the pressure be increased to about 3300 p.s.i., the diaphragm, the ball 39, the stem 27 and the ball 22 will be moved about .0001 inch which is sufficient to unseat the ball 22 to open the valve 10 and cause a device (not shown) for rendering the compressor ineffective to be energized. During this period of operation, the diaphragm holds the ball 39 on the seat 38 to shut off communication between the valve outlet and the vented side of the diaphragm chamber.

As air in the reservoir is used and its pressure drops slightly below 3300 p.s.i., the diaphragm and the stem move upwardly and enable the ball 22 to seal on disc 21. Air is trapped between the two balls and the device attached to port 17. When the reservoir pressure drops below 3000 p.s.i. the stem is returned by the spring 40 to its stop 36 and then moves out of contact with the ball 39, whereby air under pressure in the valve outlet lifts the ball 39 and is bled to atmosphere through the vent 30 thereby causing the device to be de-energized and the compressor to be effective again.

It has been found by test that the above described apparatus has a useful life in excess of 20,000 cycles of operation and is operable at temperatures between —65° and 160° F.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A valve controlled in response to changes in pressure of high pressure air comprising a valve body having an inlet, an outlet and a passageway between said inlet and said outlet; a rigid seat member in said passageway having a port for establishing fluid flow communication between said inlet and said outlet and having a surface facing said inlet; a disc having an aperture in registry with said port and being formed of a thin highly durable film of resin capable of resisting deformation at high mechanical pressure; means for holding said disc against said seat member surface; a ball adjacent said disc for opening and closing said aperture; a spring for urging said ball against said disc to close said aperture; a stem for moving said ball away from said disc to open said aperture; a diaphragm responsive to changes in pressures of high pressure air to deflect and effect movement of said stem for a distance less than the thickness of said disc; said diaphragm being mounted in a chamber having a vent at one side of said diaphragm and having an inlet for high pressure air at the other side of said diaphragm, said stem having a passageway for establishing flow communication between said outlet and the vented side of said chamber terminating in a valve seat facing said chamber; and a valve member for said valve seat adapted to be engaged by said diaphragm to effect movement of said stem.

2. A valve according to claim 1, including an adjustable stop for limiting movement of said stem towards said diaphragm, and a spring for urging said stem against said stop.

3. A valve adapted to be opened and closed by extremely small movement comprising a valve body having an inlet, an outlet and a passageway between said inlet and said outlet; a rigid seat member in said passageway having a port for establishing fluid flow communication between said inlet and said outlet and having a surface facing said inlet; a disc having an aperture in registry with said port and being formed of a thin highly durable film of resin having a thickness of between about .0050 and about .0075 inch and being capable of resisting deformation at high mechanical pressure; means for holding said disc against said seat member surface; a ball adjacent said disc for opening and closing said aperture; a spring for urging said ball against said disc to close said aperture; and a stem having a short stroke for moving said ball away from said disc about .0001 inch to open said aperture.

4. A valve controlled in response to changes in pressure of high pressure air comprising a valve body having an inlet, an outlet and a passageway between said inlet and said outlet; a rigid seat member in said passageway having a port for estblishing fluid flow communication between said inlet and said outlet and having a surface facing said inlet; a disc having an aperture in registry with said port and being formed of a thin highly durable film of resin having a thickness of between about .0050 and about .0075 inch and being capable of resisting deformation at high mechanical pressure; means for holding said disc against said seat member surface; a ball adjacent said disc for opening and closing said aperture; a spring for urging said ball against said disc to close said aperture; a stem for moving said ball away from said disc about .0001 inch to open said aperture; and a diaphragm responsive to changes in pressure of high pressure air having a small distance of travel for effecting movement of said stem.

References Cited in the file of this patent

UNITED STATES PATENTS

| | | |
|---|---|---|
| 2,185,099 | Woodbridge | Dec. 26, 1939 |
| 2,247,520 | Paxton | July 1, 1941 |
| 2,377,227 | Griswold | May 29, 1945 |
| 2,409,220 | Melichar et al. | Oct. 15, 1946 |
| 2,434,262 | Delany et al. | Jan. 13, 1948 |
| 2,470,372 | Roth | May 17, 1949 |
| 2,589,019 | Neuroth | Mar. 11, 1952 |
| 2,629,363 | McClay | Feb. 24, 1953 |
| 2,699,180 | Frye | Jan. 11, 1955 |
| 2,797,701 | Nurkiewicz | July 2, 1957 |

FOREIGN PATENTS

| | | |
|---|---|---|
| 521,728 | Great Britain | May 29, 1940 |